United States Patent [19]

Toledo

[11] Patent Number: 4,665,863

[45] Date of Patent: May 19, 1987

[54] ANIMAL FEEDING APPARATUS

[76] Inventor: George F. Toledo, 2545 N. Mountain Ave., Claremont, Calif. 91711

[21] Appl. No.: 819,685

[22] Filed: Jan. 17, 1986

[51] Int. Cl.⁴ .............................................. A01K 5/02
[52] U.S. Cl. .................................................. 119/51.13
[58] Field of Search .............. 119/51.13, 51.14, 51.15, 119/51.11, 56 R

[56]  References Cited
U.S. PATENT DOCUMENTS

| 1,192,677 | 7/1916 | Parks | 119/51.13 |
| 2,585,371 | 2/1952 | Coffing | 119/51.13 |

Primary Examiner—Hugh R. Chamblee
Attorney, Agent, or Firm—George J. Netter

[57]  ABSTRACT

A housing with separate chambers into which individual quantities of animal food can be located has a cover located over the top of the chambers leaving an entrance opening via which foodstuffs can be loaded therein. A generally vertical housing front wall includes exit openings in communication with each of the internal chambers. Door panels, one for each exit opening are pivotally connected to the housing to swing from a first position closing off a chamber exit opening, to a lower position under the action of gravity leaving the exit opening unimpeded by the door panel. Latches having parts which are biased by gravity to lockingly secure a door panel are movable in a direction to release the door panels by a continuous moving closed-loop actuator.

3 Claims, 7 Drawing Figures

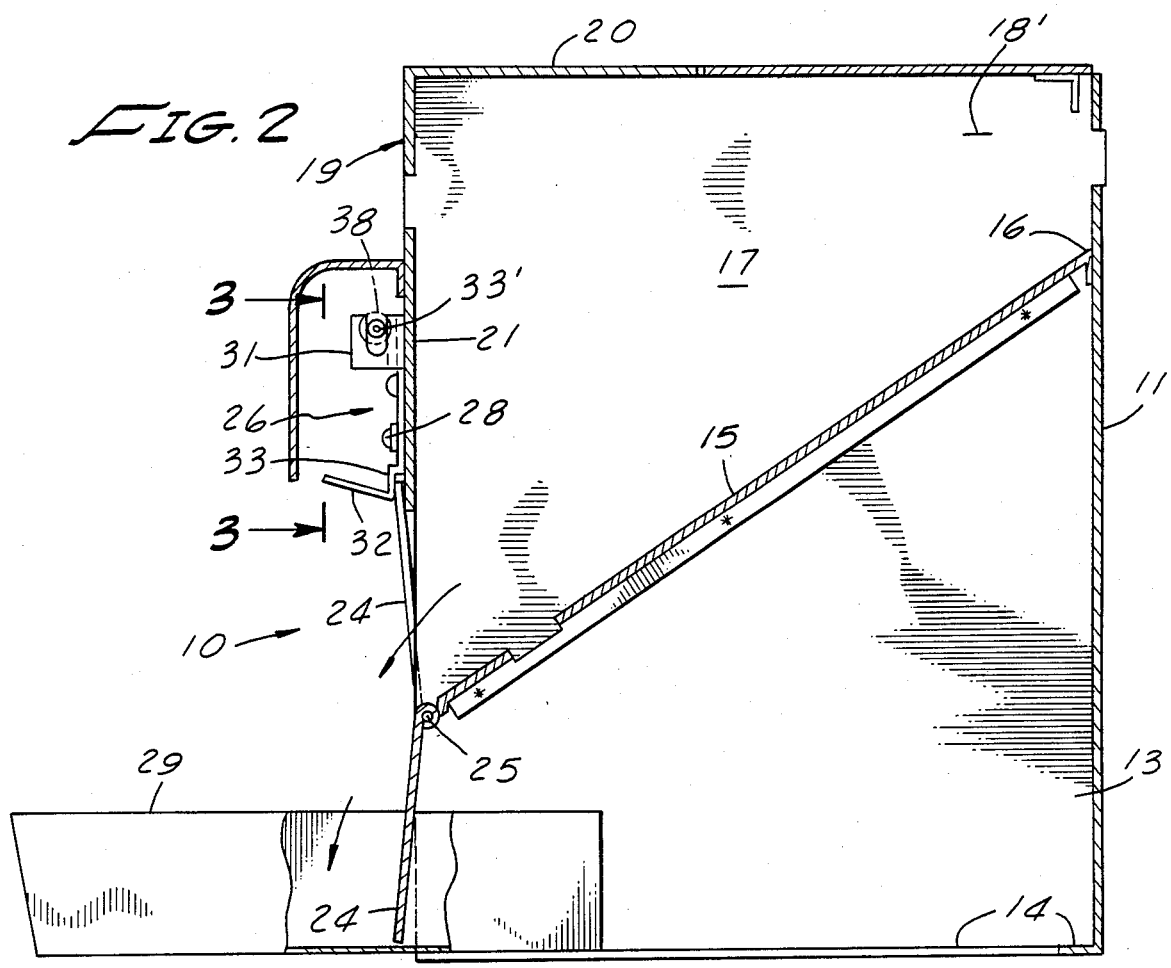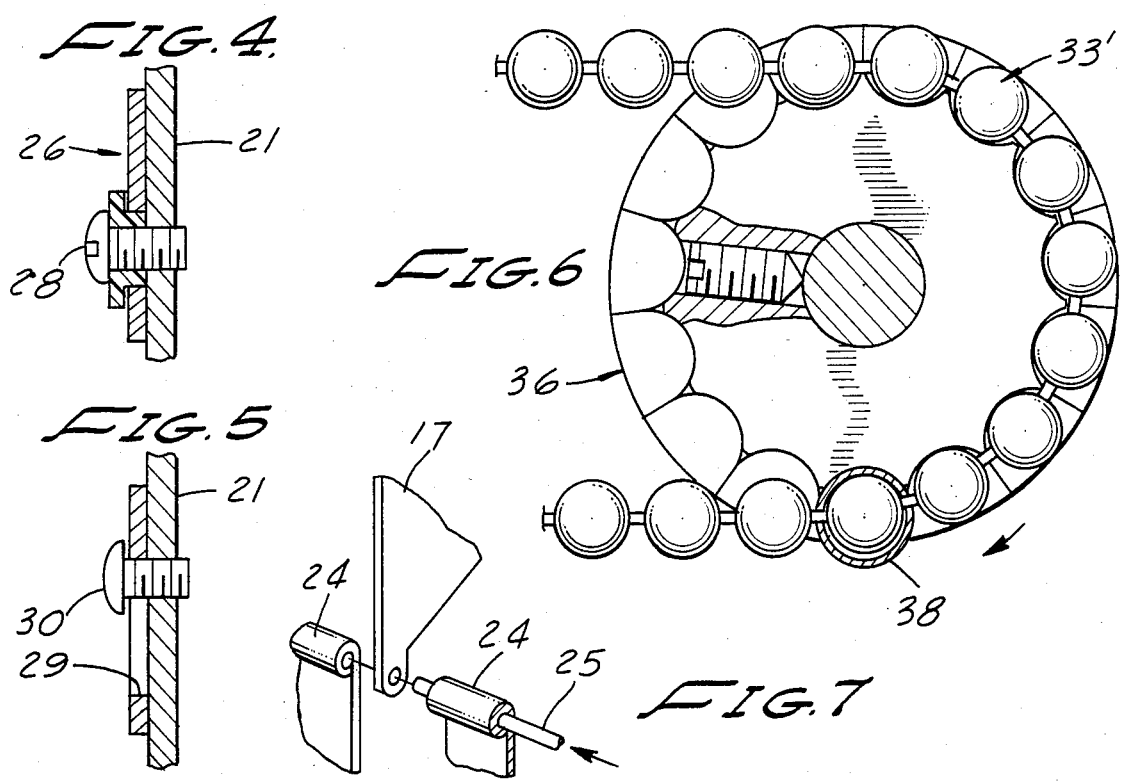

ANIMAL FEEDING APPARATUS

The present invention pertains generally to an apparatus for feeding animals, and, more particularly, to such apparatus for dispensing select quantities of food for an animal at predetermined time intervals.

BACKGROUND

The proper care of domestic animals such as cats and dogs, for example, requires periodic feeding in controlled amounts of food so as to avoid the undesirable overfeeding. Also, as is well known domestic animals quickly become used to a feeding routine where they expect to be fed at a specific time of the day and if this does not occur they may become irritable or upset.

Once established, a feeding routine should be maintained in order to insure good health and well being of an animal. Accordingly, in the event the owner of a pet has to be away for any length of time, the owner must take the necessary steps to have the animal cared for, which in the past has usually consisted of leaving the pet with the veterinarian or a friend, or having someone come to the owner's premises and feed the animal. Of course, there is an additional expense when the animal is left with the vet, and oftentimes there are no neighbors or friends with whom the animal can be conveniently left or who are willing or able to feed the animal at the owner's premises.

OBJECTS AND SUMMARY OF THE INVENTION

A housing for the apparatus includes walls defining a number of separate chambers into which individual quantities of animal food can be located. A removable cover is located over the top of the chambers which when removed exposes an entrance opening via which foodstuffs can be loaded therein. A generally vertical housing front wall includes exit openings in communication with each of the internal chambers.

A plurality of door panels, one for each exit opening, are pivotally connected to the housing to swing from a first position closing off a chamber exit opening, to a lower position under the action of gravity leaving the exit opening unimpeded by the door panel. Just above each exit opening there is pivotally mounted onto the front panel a latch having parts which are biased by gravity to engage and secure a door panel in closed relationship to the immediately adjacent exit opening. The latches are movable in a direction to release the door panel by timed driven means causing the door panel to pivot to the open position under the action of gravity.

A closed-loop bead chain having at least one enlarged sphere thereon is mounted on pulley and sprocket drive in order to have one part of the loop move along a path immediately adjacent the latches. Moreover, movement of the chain along its closed path causes the enlarged sphere to encounter each of the latches and move them to that position to release the associated door panel. In this way, the door panels are all released consecutively. A rotating power source capable of delivering rotation at a predetermined constant rate is interconnected with the sprocket to drive the bead chain along its closed-loop path at a predetermined rate (e.g., 24 hours to move the large bead from one latch to the next).

In use, with all of the door panels closed and latched, consecutively adjacent chambers are loaded with the appropriate amount of food for each feeding period, such as, for example, once every 24 hours. The power source is energized and the food chambers will then be consecutively opened by releasing the latches holding the door panels allowing the food to move along a gravity path into a receiving dish, trough, or other container.

DESCRIPTION OF THE DRAWING

FIG. 2 is a side elevational sectional view taken along the line 2—2 of FIG. 1.

FIGS. 4 and 5 are detailed sectional views taken along the lines 4—4 and 5—5 of FIG. 3 taken through a latch for the door panels.

FIG. 6 is an enlarged sectional view of a drive sprocket and bead chain meshed therewith.

FIG. 7 is an exploded, partially fragmentary view of the pivotal mounting of a door panel to the housing.

DESCRIPTION OF A PREFERRED EMBODIMENT

Figure 1:
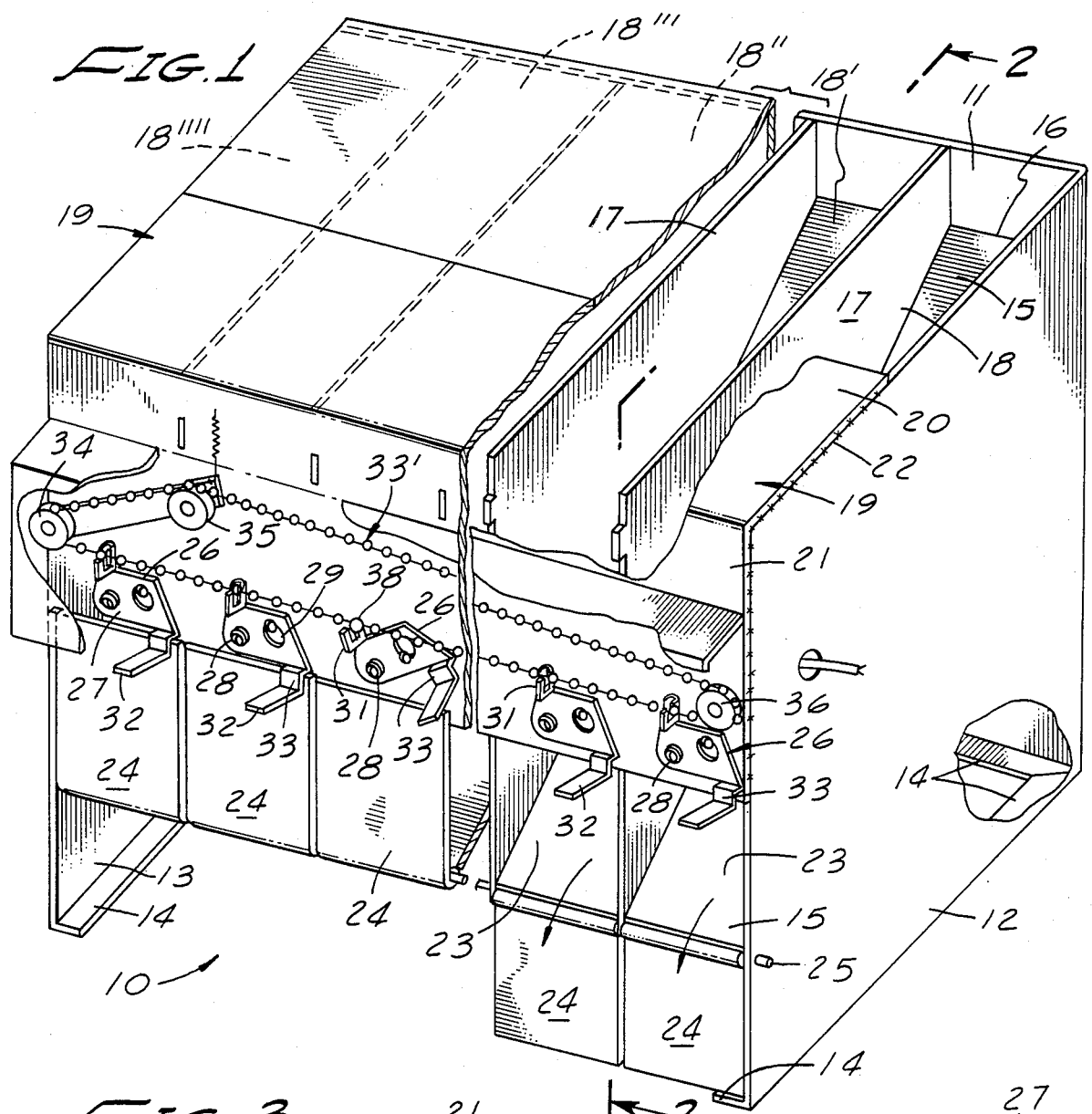
FIG. 1 is a perspective, partially fragmentary and partially sectional view of the animal feeding apparatus of this invention.

Turning now to the drawings and particularly FIG. 1, the animal food dispensing apparatus of the present invention is enumerated generally as at 10. A housing for the apparatus includes a generally rectangular wall plate bent to form a backwall 11 and two end walls 12 and 13. The lower edge of the walls 11–13 are formed at right angles to the major surface area and inwardly as at 14 to provide a generally horizontal rim on which the entire apparatus can rest. A bottom wall 15 has one edge affixed to the back wall 11 at a point spaced downwardly a slight amount from the upper edge of the back wall as at 16 and slopes downwardly to intersect the plane of the front edges of the side walls 12 and 13 at a point conveniently above the support rim 14.

A plurality of partitions 17 are arranged in spaced apart relation within the space above the bottom wall 15 to form chambers 18, 18', etc. More particularly, the partitions 17 each have their back edges secured to the housing back wall 11 and their lower edges secured to the bottom wall 15, the top edges of the partitions lying in the same plane with the top edges of the side walls 12, 13 and the back wall 15. It is contemplated that each of the chambers 18, 18' and so forth may be of identical volumes or differing volumes, as desired. Furthermore, it is contemplated that these chambers shall be of such volume as to individually contain a supply of food for an animal for a fixed period of time. For example, the chamber 18 may contain a supply of food for a twenty-four hour period and the chamber 18' may contain a second food amount for a further twenty-four hour period of time.

A fixed cover 19 consists of a generally rectangular plate formed across an intermediate fold line into two portions at substantially 90 degrees to one another, one portion 20 extending partway across the top of the housing and the second portion 21 extending downwardly partway onto the housing front. The fixed cover is secured to the sidewalls by a series of weldments 22, for example, and which leaves uncovered an upper entrance or access opening to each of the chambers 18, 18' and exit openings 23 at the lower front of the apparatus for each of the chambers.

A plurality of door panels 24, one for each chamber, are each of generally rectangular construction and of sufficient area to substantially completely cover an exit opening 23. The door panels each has the lower edge pivotally mounted on a rod 25 enabling the rotation from a first position where the exit opening is completely open. The ends of pivot rod 25 are journaled in openings in each of the sidewalls 12, 13 of the housing. More particularly, as can be seen best in FIG. 2, the upper edge of each door panel overlaps the lower end of fixed cover portion 21 which leaves the resultant gravity action on the door panel such as to cause the door panel to automatically swing downwardly into the open position unless it is affirmatively retained in its upper or closed position. Although other means can be employed, it is preferred that the lower edge of each door panel be rolled to form an opening through which the pivot pin passes.

On the outer surface of the fixed cover portion 21 there are provided a plurality of latches 26, one for each exit opening. The latches are identical and each include a flat plate 27 pivotally secured to the front surface of the fixed cover portion 21 as at 28. An oversize opening 29 has a positioning pin 30 passing therethrough and secured to 21 for limiting the pivotal swing of the latch. A yoke 31 affixed to the top edge of the latch plate 27 extends at 90 degrees from the plate and has the yoke opening pointed upwardly. A locking arc 32 at the lower edge of the latch plate extends outwardly substantially 90 degrees from the latch plate surface and has a hooked shaped portion 33 which in the lower most position of the latch grips the door panel upper edge holding the door panel in closed relation over the compartment exit opening.

The means for actuating the various latches in consecutive order consists of a closed-loop bead chain 33' drivingly related with first and second pulleys 34 and 35 and a sprocket 36. The sprocket is provided with rotative power by an electrical motor 37 geared down to the desired low rotational velocity. The lower portion of the closed loop bead chain is aligned through the yokes of each of the latches and the pulley 35 is mounted on a common arm with the pulley 34 and is spring loaded for providing a predetermined amount of tensioning to the bead chain.

Figure 3:
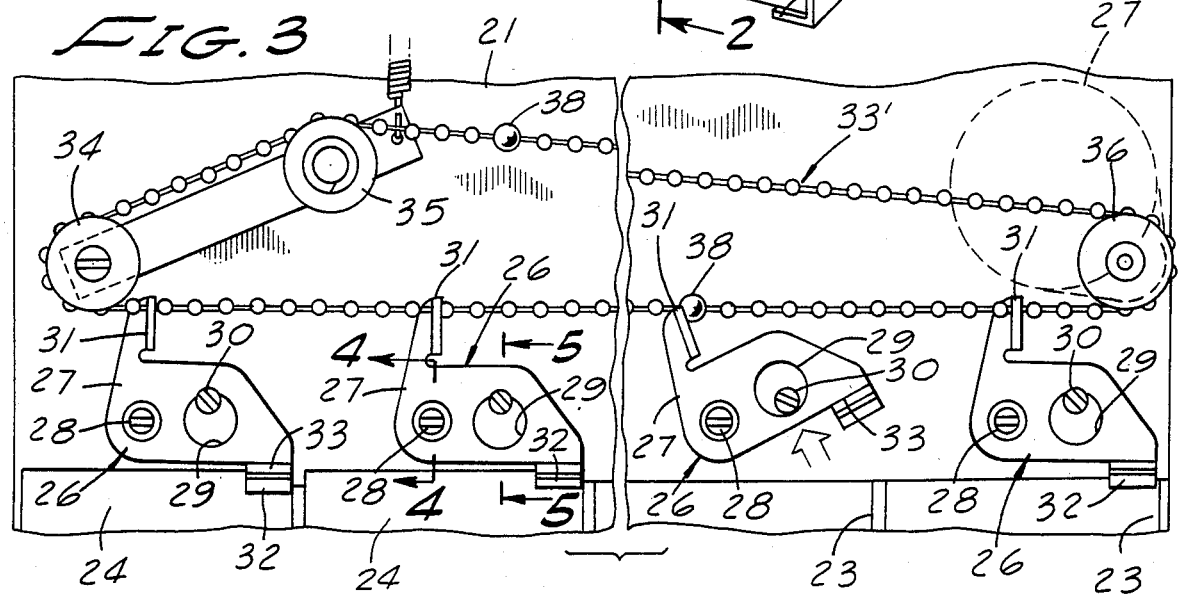
FIG. 3 is a front elevational sectional view taken along the line 3—3 of FIG. 2.

With reference now to FIGS. 1, 3 and 6, at least one enlarged bead or sphere 38 is mounted onto one of the smaller beads of the bead chain and is of such size that when it attempts to pass through a yoke, it engages the yoke arms instead and rotates the latch. The sphere 38 includes a hollow outer shell which has been located over a smaller bead of the chain. The interconnecting links of the bead chain for the sphere pass through oversized openings in the outer shell which permits the entire chain, including the oversized sphere, to be meshed with the drive pulley and maintained in a predetermined indexed relation. Thus, the chain can be selectively and precisely indexed or arranged in timed relationship by the notches on the drive sprocket so as to consecutively release the latches at a predetermined time interval. Initially, the sphere 38 of the chain must be properly located in order to actuate the door panel release for compartment 18.

In the usual case, feeding periods for an animal will be once a day or possibly twice a day. Accordingly, the drive speed of motor 37 and spacing between adjacent latches must be adapted to provide the desired interval between animal feeding.

In use, initially each of the door panels are closed and a satisfactory amount of feed material for the individual periods of time are placed in the compartments 18, 18', etc. to accommodate the required number of automatic feedings that are desired. A feeding dish or trough 39 is located at the front of the apparatus as shown in FIG. 2 just under the exit openings 23 for the compartments. Assuming, for example, that it is desired each of the compartments is loaded with a foodstuff to be dispensed on a twenty-four hour basis, the bead chain is then appropriately located on the drive sprocket for correct starting and the electical drive is commenced. When it is time for the first dispensing of food, the latch associated with compartment 18 is tripped by the sphere 38, the door panel opens and the food moves out of the compartment along a gravity path into the feeding dish or trough 39. When the next period of time has passed, the sphere engages the yoke arms of the latch associated with compartment 18' and the door panel is opened as before. This process is repeated until all of the doorpanels have been opened and the food dispensed.

Although as described there may be a large number of compartments, clearly the apparatus may be used for a lesser number. For example, if the owner of the animal is leaving for only two days, it will only be necessary to fill two compartments 18 and 18' with food, and initially latch the door panels in place for just those two compartments. Whether the other door panels are open or closed will not affect operation.

I claim:

1. Apparatus for dispensing food to an open-top animal feeding trough or container, comprising:
   a housing having a plurality of compartments arranged in generally horizontal side by side relation, each compartment having an entrance opening and an a lateral exit opening;
   a door panel for each housing exit opening pivotally mounted to said housing and movable by gravity from a first position covering the exit opening to a second position free from covering said exit opening;
   a plurality of rotatable latch means, one for each door panel, mounted on said housing and selectively movable from a first position holding a door panel in covering relation to a housing exit opening to a second position releasing the door panel to uncover the exit opening, said latch means being movable from the second to the first position by gravity;
   separate yoke means mounted on each latch means;
   a closed loop member extending through each yoke means of the rotatable latch means;
   a mechanical power source for driving said member along its closed loop; and
   an actuator carried by the closed loop member for engaging each of the yoke means as said actuator is moved therethrough to move said latch means from the first to the second position.

2. Apparatus as in claim 1, in which the closed-loop member includes a bead chain having a plurality of balls interconnected by links.

3. Apparatus as in claim 2, in which the actuator includes an enlarged hollow sphere received over one of the balls of the bead chain, said enlarged hollow sphere being of such size as to obstructingly engage the yoke means and rotate the latch means as said sphere moves therepast.

* * * * *